UNITED STATES PATENT OFFICE 2,295,167

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 21, 1941, Serial No. 384,599

11 Claims. (Cl. 252—335)

This invention relates primarily to the resolution of petroleum emulsions.

The main object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The new chemical compound or composition of matter herein described, which is used as the demulsifier in our improved process for resolving petroleum emulsions, is exemplified by the acid or preferably neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, is reacted with a polybasic carboxy acid, which, similarly, may conveniently be indicated as being of the dibasic type, by the formula

HOOC.D.COOH then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience these polyethylene glycols may be indicated by the following formula OH($C_2H_4O$)$_m$H in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

OH($C_nH_{2n}O$)$_m$H in which $m$ has its previous significance and $n$ represents a numeral varying from 2 to 4.

Thus, the bulk of the demulsifying materials herein described, may be indicated within certain variations, as hereinafter stated, by the neutral ester derived by esterification of one mole of a glycol of the kind above described, with two moles of a fractional ester of the kind previously indicated. The formation of the compound may be indicated by the following reaction, although obviously it is immaterial what particular procedure is employed to produce the particular chemical compound or product:

T.OOC.D.COOH+OH($C_2H_4O$)$_m$H+
HOOC.D.COO.T→
T.OOC.D.COO($C_2H_4O$)$_{m-1}C_2H_4$.OOC.D.COO.T

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–12 oxyalkylene groups, particularly 8–12 oxyethylene groups. The preference to use the oxyethylated compounds is due largely to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol, or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions. If a high molal sulfonic acid be indicated by the conventional formula:

$$R.SO_3H$$

then a hydroxylated ester which may actually have more than one hydroxyl group in the radical which replaces the sulfonic acid hydrogen atom, may be indicated by the following formula:

$$R.SO_3TOH$$

It will be pointed out subsequently that quite a variety of hydroxylated esters of high mole sulfonic acids are obtainable which correspond to the above generic formula. In many instances T, instead of representing a hydrocarbon radical, will represent a hydrophobe radical, in which the carbon atom chain is interrupted at least once by an oxygen atom. Such esters are water-insoluble and undergo esterification in a manner analogous to high molal alcohols. A material of the kind above described illustrates the compounds herein contemplated with certain added provisos:

(a) That the sulfonic acid in the form of a salt or acid, be surface-active, as subsequently defined; and (b) That the ester derived therefrom and containing the hydroxy alkyl group or its equivalent, be water-insoluble.

As has been indicated, the compounds herein contemplated are derivatives of surface-active sulfonic acids, which, generally speaking, are water-soluble, but in some instances, such as in the case of petroleum mahogany acids, may be essentially oil-soluble, although such oil-soluble acids may also show water-solubility to a greater or lesser degree, particularly in the form of sodium, potassium, or ammonium salts. Such sulfonic acids have a molecular weight range between 200 and 1,000, and are characterized by the fact that their alkali metal salts are surface-active. By "surface-active" we mean that a relatively dilute solution of alkali metal salts, for instance, the sodium or potassium salt, and also ammonium salt, in a solution containing a few tenths of a percent or thereabouts, will show a marked lowering of the static surface tension, in comparison with distilled water. Where the sulfonic acids or their salts are oil-soluble, surface-activity may be indicated by the ability or characteristic property of producing water-in-oil emulsions, and sometimes by the ability to cause oily vehicles to foam or froth. Usually, the acids themselves show the same surface-active property as the salts.

Although the types of compounds employed as the demulsifier in our herein-described process for resolving petroleum emulsions are new chemical products, and the method we have devised for producing said compounds is also new, certain of the raw materials used in the manufacture of said chemical compounds, for example, certain surface-active sulfonic acids, are well known compositions of matter. In order to show the wide range of suitable sulfonic acids, brief reference will be made to a variety of such materials.

More specifically, in the manufacture of compounds of the kind herein contemplated, one may employ as raw materials petroleum sulfonic acids, fatty sulfonic acids, fatty aromatic sulfonic acids, alkylated monocarbocyclic sulfonic acids, alkylated non-hydrogenated dicarbocyclic sulfonic acids, partially or completely hydrogenated alkylated dicarbocyclic sulfonic acids, alkylated polycarbocyclic sulfonic acids containing at least three nuclei, cycloalkylated carbocyclic sulfonic acids free of alkyl radicals, and aralkylated carbocyclic sulfonic acids free of alkyl radicals. In some instances the actual manufacture involves the formation of a salt of a sulfonic acid, rather than a sulfonic acid, as, for example, where sodium bisulfite or sodium sulfite is used as a sulfonating agent. In such instances the sulfonic acid can generally be obtained by some conventional procedure, as, for example, dissolving the sodium sulfonic acid salt in any suitable low molal alcohol, passing in hydrochloric acid gas with the precipitation of sodium chloride, and the liberation of a sulfonic acid which is usually soluble in the alcoholic medium. The alcoholic solution of the sulfonic acid can be separated from the inorganic salt by filtration, and then the sulfonic acid can be recovered by distillation of the alcoholic solvent.

The sulfonic acids derived from petroleum constitute an important group of acids which may be used as raw materials for the manufacture of compounds or demulsifiers of the type contemplated by our invention. Petroleum sulfonic acids, regardless of whether derived as the principal product of reaction or as the by-product, can be divided into two general types, to wit, green acid or acids, and mahogany acid or acids. The green acids are characterized by being water-soluble or dispersible. Illustrating this tpye of petroleum acid, reference is made to the following patents, to wit: U. S. Patents Nos. 1,395,195, dated Jan. 24, 1933, Limburg; 1,836,429, dated Dec. 15, 1931, Baddiley et al.; 1,955,859, dated Apr. 24, 1934, Osburn et al.; 1,836,428, 1,836,429, 1,836,430, and 1,836,431, dated Dec. 15, 1931, Baddiley et al.; 1,766,063, dated June 24, 1930, De Groote et al.; 1,909,295, dated May 16, 1933, Luther et al.; and 2,042,410, dated May 6, 1936, Pierce. German Patent No. 550,242, dated May 19, 1932, Chemische Fabrik Pott & Company.

Water-soluble salts of true sulfo-naphthenic acids, i. e., chemical compounds containing a naphthene nucleus, a sulfonic group, and a carboxy group, represent a suitable type of a break-inducing agent. Such compounds, of course, must be differentiated from sulfo-naphthenes, i. e., the naphthene type of compound containing a sulfonic acid group, but no carboxyl. See British Patent No. 275,267, dated February 4, 1929, to Chemische Fabrik Milch, A. G.

As to the manufacture of oil-soluble petroleum sulfonic acids, see the following: U. S. Patents Nos. 2,115,843, dated May 3, 1938, Dawson; 2,158,680, dated May 16, 1939, Retailliau; 2,166,117, dated July 18, 1939, Blumer; 2,168,315, dated Aug. 8, 1939, Blumer; 2,188,770, dated Jan. 30, 1940, Robertson; 2,201,119, dated May 14, 1940, Blumer et al.; 2,203,440 and 2,203,441, dated June 4, 1940, Oliver; 2,203,443, dated June 4, 1940, Ross; and 2,209,445, dated July 30, 1940, De Mering.

The sulfonic acids derived from fatty acids or fatty materials whose water-soluble salts are contemplated in the present invention, are of the kind which have been frequently employed as fat splitters. Their composition and method of making the same are well understood, and they are available from the usual sources. For the manufacture of fatty sulfonic acids, reference is made to the following patents: U. S. Patents Nos. 601,603, dated May 29, 1898, Twitchell; 1,931,491, dated Oct. 24, 1933, Hausman; 1,926,715, dated Sept 12, 1933, De Groote et al.; and 1,988,833, dated Jan. 22, 1935, De Groote et al.

Another type of a suitable fatty sulfonic acid is the type which is characterized by the fact that an aromatic radical is included and that the sulfonic group is directly attached to the aromatic nucleus, instead of being directly attached to the hydrocarbon chain of the fatty acid. This type is commonly referred to as a Twitchell reagent. See U. S. Patent No. 628,503, dated July 11, 1899, to Twitchell.

See also "Arylstearic acids from oleic acid," A. J. Stirton and R. F. Peterson, Industrial and Engineering Chemistry, July 1939, pp. 856–858, and "Sulfonated arylstearic acids," A. J. Stirton, R. F. Peterson and P. H. Groggins, Industrial and Engineering Chemistry, August, 1940, pp. 1136–37.

Another class of suitable sulfonic acids which may be employed as raw materials, include the alkylated aromatic sulfonic acids. Although such acids may be derived from monocyclic aromatic compounds, such as cymene or the like, it is preferable that they be derived from polycyclic aromatic compounds, such as napththalene, anthracene, diphenyl, etc. Generally speaking, it is usually preferable to use naphthalene for various reasons, but particularly due to its low cost. In regard to the uncondensed polycyclic compounds, it is generally desirable to use diphenyl or hydroxyl diphenyl. Although reference has been made to compounds derived from naphthalene, it is obvious that similar compounds, i. e., alkylated sulfonic acids, can be derived from any other suitable polycyclic material, condensed or uncondensed, or may be derived from a monocyclic material. The production of alkylated naphthalene sulfonic acids is described in U. S. Patent No. 2,076,623, dated April 13, 1937, to De Groote et al.

In some instances compounds of the kind described are manufactured most expediently from olefines or diolefines, as, for instance, the type illustrated in U. S. Patent No. 2,072,153, dated March 2, 1937, to Bruson et al. In some instances it is particularly desirable to introduce an alkyl radical having more than 10 carbon atoms, and possibly as many as 30 carbon atoms. Such materials may be manufactured in the manner described in U. S. Patent No. 2,083,223, dated January 8, 1937, to De Groote, or as described in U. S. Patent No. 2,161,173, dated June 6, 1939, to Kyrides. See also U. S. Patent No. 2,218,472, dated October 15, 1940, to Kyrides.

For the manufacture of sulfonated alkylated diphenyl compounds, reference is made to U. S. Patent No. 1,901,507, dated March 14, 1933, to Guenther, and U. S. Patent No. 2,135,978, dated November 8, 1938, to Magoun.

As to similar materials having an alicyclic nucleus, and more particularly, an aromatic nucleus, reference is made to the aforementioned Guenther U. S. Patent No. 1,901,507. Similarly, mono-, di-, or triamylated naphthalene, which is an article of commerce, may be hydrogenated and subjected to sulfonation. Another commercially available compound, which is suitable for use is retene sulfonic acid or its sodium salt.

In the manufacture of compounds of the kind previously described, it is not necessary to employ alkyl alcohols, but, if desired, alicyclic alcohols, such as cyclohexanol, or an aralkyl alcohol, such as benzyl alcohol, may be employed, or the equivalent of cyclohexanol, to wit, a cyclic olefine may be employed. Obviously, if an aralkyl alcohol is employed, for instance, benzyl alcohol and benzene or naphthalene, one obtains in essence a diaryl methane; and it is intended to include in the description of our invention, the use of sulfonated diaryl methanes and their various homologues in the present invention. This type of material is also obtainable in other ways, for instance, condensation of two nuclei by introduction of the methylene bridge or substituted methylene bridge derived from formaldehyde or acetone or similar compounds. In this connection reference is made to U. S. Patent No. 1,336,759, dated April 13, 1920, to Schmidt, and to British Patent No. 467,998, dated December 28, 1935, to Carpmael.

It is well known that sulfonic acids are readily obtained from tallol, rosin, rosin derivatives, and the like. In many instances, the same procedure can be applied as is used in the manufacture of sulfonic acids from fatty acids. As to the nature of tallol, which is now available commercially in both the crude and refined types, see Ellis, Chemistry of Synthetic Resins, 1935, volume 1, page 754–755. See also U. S. Patent No. 1,961,963, dated June 5, 1934, to De Groote et al.; U. S. Patent No. 1,913,538, dated June 13, 1933, to De Groote et al.; and U. S. Patent No. 1,910,680, dated May 23, 1933, to De Groote et al. See especially, U. S. Patent No. 2,220,678, dated November 5, 1940, to Cromwell and Merley.

As to certain sulfonic acids containing amino or amido linkages, see the following U. S. Patents to Guenther et al., to wit, No. 1,932,176, dated October 24, 1933 and Nos. 1,932,180, 1,932,178 and 1,932,177, all dated October 24, 1933.

As to aromatic alkylene ether sulfonates and similar types, see the following: U. S. Patent No. 2,178,831 and 2,178,832, both dated November 7, 1939, to Bruson; U. S. Patent No. 2,178,829, dated November 7, 1939, to Bruson et al.; and U. S. Patent No. 2,184,935, dated December 26, 1939, to Bruson et al.

As to sulfo-dicarboxylic acids which are surface-active, if at least one carboxylic hydrogen atom has been replaced by a hydrophobe group having at least 8 carbon atoms, such as an octyl group or the like, see U. S. Patent No. 2,028,091, dated January 14, 1936, to Jaeger; and U. S. Patent No. 2,176,423, dated October 17, 1939, to Jaeger.

As to patents illustrating other suitable high molal sulfonic acids, which may be employed as raw materials, see the following patents: U. S. Patents No. 2,110,848, dated Mar. 8, 1938, to De Groote; 1,181,172, dated Oct. 4, 1932, to Daimler et al.; 1,916,776, dated July 4, 1938, to Steindorff et al.; 2,106,242, dated Jan. 25, 1938, to De Groote et al.; and 2,110,847, dated Mar 8, 1938, to De Groote.

High molal alcohols, for instance, naphthyl alcohol, can be treated so as to yield a sulfonic acid. Such high molal alcohol sulfonic acid may be employed as a raw material. See U. S. Patent No. 2,000,944, dated May 14, 1935, to Schrauth. See also the following: U. S. Patents No. 2,061,617, 2,061,618, 2,061,619, and 2,061,620, dated Nov. 24, 1936, to Downing et al.; 2,171,117, dated Aug. 29, 1939, to Schrauth et al.; 2,187,338 and 2,187,339, dated Jan. 16, 1940, to Werntz; 1,917,255, dated July 11, 1933, to Harris; 2,170,380, dated August 22, 1939, to Holsten, and 1,966,177, dated July 10, 1934, to Schirm.

The method of manufacturing hydroxylated esters of sulfonic acids is well known, although direct reaction between the sulfonic acid and a polyhydric alcohol, such as ethylene glycol, is not applicable, for the reason that one obtains little or no yield of the hydroxylated ester. One procedure contemplates the conversion of sulfonic acid into the sulfonchloride, and subsequently reacting the sulfonchloride with a polyhydric alcohol, with the liberation of hydrochloric acid. Another procedure involves reaction between the sulfonic acid, or preferably a salt, such as the sodium salt, and the chlorhydrin, such as ethylene glycol chlorhydrin. Still another procedure for the manufacture of such hydroxylated sulfonic acid esters has been illustrated in some of the patents previously referred to, and particularly, the aforementioned De Groote et al. U. S. Patent No. 2,106,242, dated January 25, 1938. See last three formulas on page 3 of said De Groote et al. patent.

In connection with materials of the kind typified by these formulas, it is desirable to employ a substituted methyl chloride. For instance, one can obtain diamylated naphthalene, triamlyated naphthalene, mono-octylated naphthalene, or the like. Such materials can be converted into the substituted naphthyl methylchloride by the procedure indicated in U. S. Patent No. 2,166,554, dated July 18, 1939, to Roblin.

The preferred way of preparing such materials is to use the procedure described in U. S. Patent No. 2,208,581, dated July 23, 1940, to Hoeffelmann. Briefly stated, the procedure employed is to obtain the free sulfonic acid in an anhydrous state and treat with a compound containing an olefine oxide radical. As typical examples of applicable compounds, may be mentioned glycerine epichlorhydrin, glycide alcohol, ethylene oxide, propylene oxide, butene-2-oxide, butene-1-oxide, isobutylene oxide, butadiene oxide, butadiene dioxide, chloro-prene oxide, isoprene oxide, decene oxide, styrene oxide, cyclohexylene oxide, cyclopentene oxide, etc.

Note, however, that there are certain differences between the procedure employed for the manufacture of the intermediate raw material of the procedure, as employed in said aforementioned Hoeffelmann patent. The Hoeffelmann method contemplates treatment of sulfonic acids, which are not necessarily surface-active, for instance, benzene sulfonic acid, with an olefine oxide, so as to produce materials which are, for the main part, water-soluble and surface-active. It happens that invariably the esters of the high molal sulfonic acids are insoluble in absence of a recurring ether linkage. In order to obtain compounds of the kind herein contemplated, one must stop treatment with the olefine oxide, i. e., oxyalkylation, before water solubility is obtained; and furthermore, it is desirable to stop water solubility at the earliest stage. In other words, the olefine oxide employed, whether ethylene oxide, propylene oxide, butylene oxide, glycidol, methyl glycidol, or the like, is a comparatively expensive reagent; and one is only concerned with obtaining a reactive hydroxyl radical for a subsequent sulfation step. There is no objection to the presence of a recurring ether linkage, provided that the ester is still water-insoluble. This may be illustrated in the following manner, using ethylene oxide as the reactant:

$RSO_3C_2H_4OH$
$RSO_3C_2H_4OC_2H_4OH$
$RSO_3C_2H_4OC_2H_4OC_2H_4OH$
$RSO_3(C_2H_4O)_nH$

One is interested primarily in obtaining a material of the following type:

RSO₃C₂H₄OH

But materials illustrated by any of the three subsequent types:

RSO₃C₂H₄OC₂H₄OH
RSO₃C₂H₄OC₂H₄OC₂H₄OH
RSO₃(C₂H₄O)ₙH are just as satisfactory, provided that the ester, prior to esterification with an intermediate product of the kind subsequently described in detail, is water-insoluble. In some instances, the presence of the recurring ether linkage may give some added desirable characteristic. Ordinarily speaking, one is concerned only with minimum reactant cost; and thus, the use of an excess amount of the olefine oxide is not justified. One is not attempting to obtain water solubility by means of the expensive oxyalkylation step. As has been emphasized, the ester obtained must be water-insoluble, regardless of how much or how little alkylene oxide is employed. Generally speaking, 40 moles of alkylene oxide per mole of sulfonic acid may be considered as an upper limit, but obviously, solubility is influenced by the alkylene oxide employed. Butylene oxide naturally will not cause a sulfonic acid to be converted into a water-soluble ester as readily as ethylene oxide.

It is to be particularly noted that the procedure herein contemplated is especially valuable in producing desirable materials from comparatively inexpensive sulfonic acids, i. e., sulfonic acids of the type exemplified, water-soluble petroleum sulfonic acids, oil-soluble petroleum sulfonic acids, alkylaryl sulfonic acids derived, for example, from naphthalene and isopropyl alcohol, Twitchell type acids, i. e., sulfo-aromatic fatty acids, and low-priced sulfonic acids derived from rosin, modified rosin, and tallol, with or without the addition of aromatic materials.

*Hydroxylated sulfonic acid esters, Example 1*

A mahogany sulfonate obtained from the manufacture of white oil from Pennsylvania grade of crude petroleum is treated in the manner described in the aforementioned Kessler and Salzmann Patent No. 2,125,300. The material, so obtained, may contain moisture in varying amounts from a few tenths of a percent, to an appreciable amount. If the amount of moisture present represents more than two or three percent, or even in such instances where this relatively small percentage is present, it is preferably converted to the anhydrous state by admixture with xylene or a similar high boiling solvent. The amount of solvent employed may be several times the volume of sulfonate. Such xylene is distilled off and carries with it any moisture or water present. The vapors are condensed and the water separated from the xylene. The xylene can be returned to the sulfonated mass being hydrated so as to permit a continuous process in which the xylene is used repeatedly. When the sulfonation mass is reduced to a substantially anhydrous state, the xylene is distilled off, unless it is desired that a small amount be present, so as to yield a fluid sulfonated mass for subsequent reaction. The anhydrous sulfonic acid, so obtained, in the presence or absence of a selected inert solvent, is reacted with one to three moles of ethylene oxide in the manner described in the aforementioned Hoeffelmann Patent No. 2,208,581, so as to yield a water-insoluble ester.

*Hydroxylated sulfonic acid esters, Example 2*

Green acids are obtained from a Gulf Coast lubricating oil distillate having an S. U. viscosity at 100° F. of about 400 seconds. The procedure employed is that described in the aforementioned Robertson Patent No. 2,188,770. The material, so obtained, contains considerable moisture and must be dehydrated by any conventional procedure, such a vacuum drier, or by means of xylene, or a similar high boiling solvent. The amount of solvent employed may be several times the volume of sulfonate. Such xylene is distilled off and carries with it any moisture or water present. The vapors are condensed and the water separated from the xylene. The xylene can be returned to the sulfonated mass being hydrated so as to permit a continuous process in which the xylene is used repeatedly. When the sulfonation mass is reduced to a substantially anhydrous state, the xylene is distilled off, unless it is desired that a small amount be present, so as to yield a fluid sulfonated mass for subsequent reaction. The anhydrous sulfonic acid, so obtained, in the presence or absence of a selected inert solvent, is reacted with one to three moles of ethylene oxide in the manner described in the aforementioned Hoeffelmann Patent No. 2,208,581, so as to yield a water-insoluble ester.

*Hydroxylated sulfonic acid esters, Example 3*

Dipropyl naphthalene mono-sulfonic acid is obtained in the anhydrous state by passing dry carbon dioxide gas through the same at a temperature sufficient to insure its fluidity. The dried material is admixed with about 50% by weight of xylene and is treated with one to three moles of ethylene oxide in the manner described in the aforementioned Hoeffelmann Patent No. 2,208,581, so as to yield a water-insoluble ester. The xylene can then be removed by distillation. Esterification can be conducted in the absence of xylene, if desired.

*Hydroxylated sulfonic acid esters, Example 4*

The sulfonic acid derivative of stearic acid is produced according to Example 1, of Günther and Hetzer Patent No. 1,926,442. The sulfostearic acid, so obtained, is converted into the anhydrous state by any suitable procedure. It may be heated to approximately 110 to 120° C., and dried carbon dioxide gas passed through until the material is anhydrous. It may be dried in a vacuum drier, so as to yield an anhydrous material. It may be distilled in the presence of an insoluble solvent such as xylene, so that the xylene is permitted to carry off water during the distillation. Vapors, so obtained, are condensed and the water separated from the xylene. The xylene can be returned for re-circulation so as to carry off more water.

Having obtained an anhydrous material of the kind above described, it is diluted with several times its weight of anhydrous ethyl alcohol and refluxed until the carboxyl hydrogen atom has been replaced by an ethyl radical. One pound mole of the anhydrous ethyl stearate sulfonic acid, so obtained, is treated with one to three moles of ethylene oxide in the manner described in the aforementioned Hoeffelmann Patent No. 2,208,581, so as to yield a water-insoluble ester.

*Hydroxylated sulfonic acid esters, Example 5*

The sulfo-aromatic fatty acid is produced from oleic acid and benzol in the manner described in the U. S. Patent No. 1,416,284. The sulfonated mass obtained in the customary manner is diluted and boiled or steamed in the presence of excess sulfuric acid until any fatty acid sulfates comparable to oleic acid hydrogen sulfate has been decomposed. After such decomposition of such organic acid sulfates, separation is permitted and the waste acid withdrawn. The mass, so obtained, is neutralized to the methyl orange indicator end-point, so as to neutralize all sulfonic acid radicals present. The material then is dissolved in several times its volume of water and extracted with a suitable solvent, such as petroleum ether, benzol, or the like, so as to remove unsulfated fatty material. The dilute solution of the sulfo-aromatic material, so obtained, is converted into the anhydrous state by any suitable procedure. It may be heated to approximately 110 to 120° C., and dried carbon dioxide gas passed through until the material is anhydrous. It may be dried in a vacuum drier, so as to yield an anhydrous material. It may be distilled in the presence of an insoluble solvent, such as xylene, so that the xylene is permitted to carry off water during distillation. Vapors, so obtained, are condensed and the water separated from the xylene. The xylene can be returned for re-circulation to carry off more water. In any event the anhydrous material having been obtained in any suitable manner is dissolved in any suitable low molal alcohol, such as ethyl alcohol. The alcoholic solution, substantially water-free, is treated with hydrochloric acid gas, so as to precipitate sodium chloride and liberate an alcoholic solution of the sulfo-aromatic fatty acid. The salt formed is separated and the alcoholic solution refluxed until the sulfo-aromatic material is converted into the corresponding ethyl ester by replacement of the carboxylic hydrogen atom by an ethyl group. One pound mole of the anhydrous sulfo-phenol stearic acid ethyl ester is treated with one to three moles of ethylene oxide in the manner described in the aforementioned Hoeffelmann Patent No. 2,208,581, so as to yield a water-insoluble ester.

*Hydroxylated sulfonic acid esters, Example 6*

Tallol is converted into the hydroxy ethyl ester in the manner described in Example 4 of the British Patent No. 340,272. The hydroxy ethyl ester is then esterified in equal molal proportions with chloroacetic acid. The product, so obtained, is treated in the conventional manner with one mole of sodium sulfite with the elimination of sodium chloride. The sodium sulfonate, so obtained, is dissolved in alcohol and the free sulfonic acid liberated in the manner previously suggested. The sulfonic acid, so obtained, is anhydrous or can be converted into the anhydrous state by any suitable procedure. It may be heated to approximately 110 to 120° C. and dried carbon dioxide gas passed through until the material is anhydrous. It may be dried in a vacuum drier, so as to yield an anhydrous material. It may be distilled in the presence of an insoluble solid, such as xylene, so that the xylene is permitted to carry off water during the distillation. Vapors, so obtained, are condensed and the water separated from the xylene. The xylene can be returned for re-circulation, so as to carry off more water.

Having obtained an anhydrous material of the kind above described, it is diluted with several times its weight of anhydrous ethyl alcohol and refluxed until the carboxyl hydrogen atom has been replaced by an ethyl radical. One pound mole of the anhydrous ethyl ester sulfonic acid, so obtained, is treated with one to three moles of ethylene oxide in the manner described in the aforementioned Hoeffelmann Patent No. 2,208,581, so as to yield a water-insoluble ester.

*Hydroxylated sulfonic acid esters, Example 7*

Dipentene is converted into the water-soluble sulfonic acid following the specific directions of the aforementioned Cromwell and Merley Patent No. 2,220,678. The sulfonic acid is dehydrated and treated with ethylene oxide in the same manner as in Example 6, preceding, so as to yield a water-insoluble ester.

*Hydroxylated sulfonic acid esters, Example 8*

A crude distilled pine oil is sulfonated in the manner described in Example 5 of the aforementioned Cromwell and Merley patent. The sulfonic acid is dehydrated and treated with ethylene oxide in the same manner as in Example 6, preceding, so as to yield a water-insoluble ester.

*Hydroxylated sulfonic acid esters, Example 9*

Commercial abietic acid or crude resin is sulfonated in the manner described in Example 6 of the aforementioned Cromwell and Merley patent. The sulfonic acid is dehydrated and treated with ethylene oxide in the same manner as in Example 6, preceding, so as to yield a water-insoluble ester.

*Hydroxylated sulfonic acid esters, Example 10*

The same procedure is followed as in the preceding Examples 1 to 9, inclusive, except that four to six moles of ethylene oxide are employed instead of one to three moles.

*Hydroxylated sulfonic acid esters, Example 11*

The same procedure is followed as in Examples 1 to 10, inclusive, except that propylene oxide or butylene oxide is substituted for ethylene oxide.

Thus, having obtained hydroxylated water-insoluble esters (and they may be polyhydroxylated and may or may not contain the recurring ether linkage), the next step is to react them with a dibasic ester of the kind previously described. Such reaction, of course, is merely an esterification reaction.

*Intermediate product, Example 1*

A one pound mole of nonaethylene glycol is reacted with two pound moles of maleic anhydride so as to form nonaethylene glycol dihydrogen dimaleate.

*Intermediate product, Example 2*

A mixture of lower non-distillable polyethylene glycols, representing approximately deca- to tetra-decaethylene glycol, is substituted for nonaethylene glycol in the preceding example.

*Intermediate product, Example 3*

The same procedure is followed as in Intermediate product, Examples 1 and 2, except that the molar ratio of maleic anhydride to glycol is changed so that three moles of maleic anhydride are reacted with two moles of the glycol, so as to yield a dibasic product which may be conveniently described as a further elaboration of the monomeric derivative described in preceding Examples 1 and 2. Such polymers form very slowly, and require higher temperature and comparatively longer period of reaction time. Also, it is desirable to add a small fraction of a suitable catalyst, say, one fourth of 1% of toluene sulfonic acid, and pass a dried inert gas through the reaction mass.

*Intermediate product, Example 4*

Adipic acid is substituted for maleic anhydride in Examples 1–3 preceding.

*Intermediate product, Example 5*

Oxalic acid is substituted for maleic anhydride in Examples 1–3 preceding.

*Intermediate product, Example 6*

Citric acid is substituted for maleic anhydride in Examples 1–3 preceding.

*Intermediate product, Example 7*

Succinic anhydride is substituted for maleic anhydride in Examples 1–3 preceding.

*Composition of matter, Example 1*

A pound mole of an intermediate product of the kind described in Intermediate product, Examples 1, 2 and 3 above, is reacted with 2 pound moles of a material of the kind described under "Hydroxylated sulfonic acid ester, Example 1," preceding, until substantially all dibasic carboxyl acidity has disappeared. Time of reaction may vary from a few hours to as much as 20 hours.

*Composition of matter, Example 2*

A material of the kind illustrated by "Hydroxylated sulfonic acid ester, Example 2," is substituted for "Hydroxylated sulfonic acid ester, Example 1," in Composition of matter, Example 1 preceding.

*Composition of matter, Example 3*

A material of the kind illustrated by "Hydroxylated sulfonic acid ester, Example 3" is substituted for "Hydroxylated sulfonic acid ester, Example 1," in Composition of matter, Example 1 preceding.

*Composition of matter, Example 4*

A material of the kind illustrated by "Hydroxylated sulfonic acid ester, Example 4" is substituted for "Hydroxylated sulfonic acid ester, Example 1," in Composition of matter, Example 1 preceding.

*Composition of matter, Example 5*

A material of the kind illustrated by "Hydroxylated sulfonic acid ester, Example 5" is substituted for "Hydroxylated sulfonic acid ester, Example 1," in Composition of matter, Example 1 preceding.

*Composition of matter, Example 6*

A material of the kind illustrated by "Hydroxylated sulfonic acid ester, Example 6" is substituted for "Hydroxylated sulfonic acid ester, Example 1," in Composition of matter, Example 1 preceding.

*Composition of matter, Example 7*

A material of the kind illustrated by "Hydroxylated sulfonic acid ester, Example 7" is substituted for "Hydroxylated sulfonic acid ester, Example 1," in Composition of matter, Example 1 preceding.

*Composition of matter, Example 8*

A material of the kind illustrated by "Hydroxylated sulfonic acid ester, Example 8" is substituted for "Hydroxylated sulfonic acid ester, Example 1," in Composition of matter, Example 1 preceding.

*Composition of matter, Example 9*

In Composition of matter, Examples 1–8 preceding, any residual acidity present is removed by cautiously adding a dilute solution of ammonium hydroxide until the resultant product gives a clear, limpid solution in water, particularly in dilute form.

*Composition of matter, Example 10*

In Composition of matter, Examples 1–8 preceding, any residual acidity present is removed by cautiously adding a dilute solution of triethanolamine until the resultant product gives a clear, limpid solution in water, particularly in dilute form.

*Composition of matter, Example 11*

In Composition of matter, Examples 1–8 preceding, any residual acidity present is removed by cautiously adding a dilute solution of tris-(hydroxymethyl)aminomethane until the resultant product gives a clear, limpid solution in water, particularly in dilute form.

*Composition of matter, Example 12*

The same procedure is followed as in Composition of matter, Examples 1–11, inclusive, except that an intermediate product of the kind exemplified by Intermediate product, Example 4, is substituted for that in Intermediate product, Examples 1, 2 and 3.

*Composition of matter, Example 13*

The same procedure is followed as in Composition of matter, Examples 1–11, inclusive, except that an intermediate product of the kind exemplified by Intermediate product, Example 5, is substituted for that in Intermediate product, Examples 1, 2 and 3.

*Composition of matter, Example 14*

The same procedure is followed as in Composition of matter, Examples 1–11, inclusive, except that an intermediate product of the kind exemplified by Intermediate product, Example 6, is substituted for that in Intermediate product, Examples 1, 2 and 3.

*Composition of matter, Example 15*

The same procedure is followed as in Composition of matter, Examples 1–11, inclusive, except that an intermediate product of the kind exemplified by Intermediate product, Example 7, is substituted for that in Intermediate product, Examples 1, 2 and 3.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a non-volatile inert solvent which simply acts as a diluent or viscosity reducer.

In the preceding examples, attention has been directed primarily to the monomeric form, or at least to the form in which the bifunctional alcohol, i. e., a glycol, and the polyfunctional acid, usually a bifunctional compound, react to give a chain type compound in which the adjacent acid and glycol nucleus occur as a structural unit.

For instance, in the monomeric form this may be indicated in the following manner:

acid . . . glycol . . . acid

If, however, one prepared an intermediate product employing the ratio of three moles of maleic anhydride and two moles of nonaethylene glycol, the tendency would be to produce a product which might be indicated in the following manner:

acid . . . glycol . . . acid . . . glycol . . . acid

Similarly, three moles of the glycol and four moles of the acid would give a combination which may be indicated thus:

acid . . . glycol . . . acid . . . glycol . . .
                           acid . . . glycol . . . acid Another way of stating the matter is that the composition may be indicated in the following manner:

$TOOC.D.COO[(C_2H_4O)_{m-1}C_2H_4OOC.D.COO]_xT$ in which the characters have their previous significance and $x$ is a relatively small whole number less than 10 and probably less than 5; and in the monomeric form $x$, of course, is 1. The limitations on the size of $x$ are probably influenced largely by the fact that reaction leading to further growth is dependent on random contact. Some of the products are self-emulsifiable oils or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid, instead of adipic acid;

(d) By using an alcoholic material of lower molecular weight instead of one of higher molecular weight.

In any event, it is to be noted that the compounds of the type herein contemplated are limited to the water-soluble type, i. e., those which are self-emulsifying in water, or produce a sol or a molecular solution.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional emulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned, but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances gives increased resistance, to soluble calcium and magnesium salts, for such property is of particular value. Usually, however, neutralization with a dilute solution of ammonia or the like is just as practicable and less expense.

In the hereto appended claims, the word "acyl" is used in reference to the radical $RSO_2$; i. e., one can conveniently consider the sulfonic acid $RSO_3H$ in terms of a formula indicating part of its structure, to wit, $R.SO_2.OH$.

In the hereto appended claims the words "polyhydric alcohol" are used in the conventional sense to include not only materials of the type exemplified by glycerol and ethylene glycol, but also materials of the kind in which the carbon atom chain is interrupted at least once by an oxygen atom, as, for example, diethylene glycol, diglycerol, etc.

It may be well to emphasize that compounds of the kind herein contemplated may be manufactured by any suitable method; and it is not intended to limit the compounds to any particular method of manufacture. When manufactured by the use of an alkylene oxide, it is our preference to use ethylene oxide, propylene oxide, or butylene oxide.

Having thus described our invention, what we claim as new and desire to secure by Letters Patent is:

1. A process for breaking water-in-oil emulsions, characterized by subjecting the emulsion to the action of a demulsifier comprising a water-soluble esterification product derived by reaction between: (A) two moles of a polyhydric alcohol in which one hydroxy hydrogen atom has been replaced by the acyl radical of a surface-active sulfonic acid having a molecular weight between 200 and 1,000 and said ester being water-insoluble; and (B) at least one mole of a polybasic compound; said polybasic compound being the esterification product of (a) a polyalkylene glycol having at least 7 and not more than 17 ether linkages, and the alkylene radical thereof containing at least 2 and not more than 6 carbon atoms; and (b) a polybasic carboxy acid having not more than 6 carbon atoms; and the ratio of the esterifying reactants being within the range of more than 1 and not over 2 moles of the polybasic acid for each mole of the glycol.

2. A process for breaking water-in-oil emulsions, characterized by subjecting the emulsion to the action of a demulsifier comprising a water-soluble esterification product derived by reaction between: (A) two moles of a polyhydric alcohol in which one hydroxy hydrogen atom has been replaced by the acyl radical of a surface-active sulfonic acid having a molecular weight between 200 and 500 and said ester being water-insoluble; and (B) at least one mole of a polybasic compound; said polybasic compound being the esterification product of (a) a polyalkylene glycol having at least 7 and not more than 17 ether linkages, and the alkylene radical thereof containing at least 2 and not more than 6 carbon atoms; and (b) a polybasic carboxy acid having not more than 6 carbon atoms; and the ratio of the esterifying reactants being within the range of more than 1 and not over 2 moles of the polybasic acid for each mole of the glycol.

3. A process for breaking water-in-oil emulsions, characterized by subjecting the emulsion to the action of a demulsifier comprising a neutral water-soluble esterification product, derived by reaction between: (A) two moles of a polyhydric alcohol in which one hydroxy hydrogen atom has been replaced by the acyl radical of a surface-active sulfonic acid having a molecular weight between 200 and 500 and said ester being water-insoluble; and (B) at least one mole of a polybasic compound; said polybasic compound being the esterification product of (a) a polyalkylene glycol having at least 7 and not more than 17 ether linkages, and the alkylene radical thereof containing at least 2 and not more than 6 carbon atoms; and (b) a polybasic carboxy acid having not more than 6 carbon atoms; and the ratio of the esterifying reactants being within the range of more than 1 and not over 2 moles of the polybasic acid for each mole of the glycol.

4. A process for breaking water-in-oil emulsions, characterized by subjecting the emulsion to the action of a demulsifier comprising a neutral water-soluble esterification product, derived by reaction between: (A) two moles of a polyhydric alcohol in which one hydroxy hydrogen atom has been replaced by the acyl radical of a surface-active sulfonic acid having a molecular weight between 200 and 500 and said ester being water-insoluble; and (B) at least one mole of a dibasic compound; said dibasic compound being the esterification product of (a) a polyalkylene glycol having at least 7 and not more than 17 ether linkages, and the alkylene radical thereof containing at least 2 and not more than 6 carbon atoms; and (b) a dibasic carboxy acid having not more than 6 carbon atoms; and the ratio of the esterifying reactants being within the range of more than 1 and not over 2 moles of the polybasic acid for each mole of the glycol.

5. A process for breaking water-in-oil emulsions, characterized by subjecting the emulsion to the action of a demulsifier comprising a neutral water-soluble esterification product, derived by reaction between: (A) two moles of a polyhydric alcohol in which one hydroxy hydrogen atom has been replaced by the acyl radical of a surface-active sulfonic acid having a molecular weight between 200 and 500 and said ester being water-insoluble; and (B) at least one mole of a dibasic compound; said dibasic compound being the esterification product of (a) a polyethylene glycol having at least 7 and not more than 17 ether linkages; and (b) a dibasic carboxy acid having not more than 6 carbon atoms; and the ratio of the esterifying reactants being within the range of more than 1 and not over 2 moles of the polybasic acid for each mole of the glycol.

6. A process for breaking water-in-oil emulsions, characterized by subjecting the emulsion to the action of a demulsifier comprising a neutral water-soluble esterification product, derived by reaction between one mole of a dibasic compound and two moles of a polyhydric alcohol in which one hydroxy hydrogen atom has been replaced by the acyl radical of a surface-active cyclic sulfonic acid having a molecular weight between 200 and 500, and said ester being water-insoluble; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than one and not over two moles of the dibasic acid for each mole of the glycol.

7. A process for breaking water-in-oil emulsions, characterized by subjecting the emulsion to the action of a demulsifier comprising a neutral water-soluble chemical compound of the formula type:

$$TOOC.D.COO[(C_2H_4O)_mC_2H_4OOC.D.COO]_xT$$

in which T is a radical derived by dehydroxylation of a polyhydric alcohol in which one hydroxy hydrogen atom has been replaced by the acyl radical of a surface-active cyclic sulfonic acid having a molecular weight between 200 and 500, and said ester being water-insoluble; OOC.D.COO is the acid radical derived from a dibasic acid by removal of the acidic hydrogen atoms; said acid radical having not over 6 carbon atoms; $m$ represents a numeral varying from 7 to 12; and $x$ is a small whole number less than 10.

8. A process for breaking water-in-oil emulsions, characterized by subjecting the emulsion to the action of a demulsifier comprising a neutral water-soluble chemical compound of the formula type:

$$TOOC.D.COO(C_2H_4O)_mC_2H_4OOC.D.COO.T$$

in which T is a radical derived by dehydroxylation of a polyhydric alcohol in which one hydroxy hydrogen atom has been replaced by the acyl radical of a surface-active cyclic sulfonic acid having a molecular weight between 200 and 500, and said ester being water-insoluble; OOC.D.COO is the acid radical derived from a dibasic acid by removal of the acidic hydrogen atoms; said acid radical having not over 6 carbon atoms; and $m$ represents a numeral varying from 7 to 12.

9. A process for breaking water-in-oil emulsions characterized by subjecting the emulsion to the action of a demulsifier comprising a neutral water-soluble chemical compound of the formula type:

$$TOOC.D.COO(C_2H_4O)_mC_2H_4OOC.D.COO.T$$

in which T is a radical derived by dehydroxylation of a polyhydric alcohol in which one hydroxy hydrogen atom has been replaced by the acyl radical of a surface-active cyclic sulfonic acid having a molecular weight between 200 and 500, and said ester being water-insoluble; OOC.D.COO is the acid radical derived from maleic acid by removal of the acidic hydrogen atoms; and $m$ represents a numeral varying from 7 to 12.

10. A process for breaking water-in-oil emulsions characterized by subjecting the emulsion to the action of a demulsifier comprising a neutral water-soluble chemical compound of the formula type:

$$TOOC.D.COO(C_2H_4O)_mC_2H_4OOC.D.COO.T$$

in which T is a radical derived by dehydroxylation of a polyhydric alcohol in which one hydroxy hydrogen atom has been replaced by the acyl radical of a surface-active cyclic sulfonic acid having a molecular weight between 200 and 500, and said ester being water-insoluble; OOC.D.COO is the acid radical derived from succinic acid by removal of the acidic hydrogen atoms; and $m$ represents a numeral varying from 7 to 12.

11. A process for breaking water-in-oil emulsions characterized by subjecting the emulsion to the action of a demulsifier comprising a neutral water-soluble chemical compound of the formula type:

$$TOOC.D.COO(C_2H_4O)_mC_2H_4OOC.D.COO.T$$

in which T is a radical derived by dehydroxylation of a polyhydric alcohol in which one hydroxy hydrogen atom has been replaced by the acyl radical of a surface-active cyclic sulfonic acid having a molecular weight between 200 and 500, and said ester being water-insoluble; OOC.D.COO is the acid radical derived from adipic acid by removal of the acidic hydrogen atoms; and $m$ represents a numeral varying from 7 to 12.

MELVIN DE GROOTE.
BERNHARD KEISER.